(12) United States Patent
Wang et al.

(10) Patent No.: US 7,447,009 B2
(45) Date of Patent: Nov. 4, 2008

(54) PORTABLE ELECTRONIC DEVICE

(75) Inventors: Shih-Hsuan Wang, Taipei (TW); Pei-Ru Tsai, Taipei (TW)

(73) Assignee: Inventec Corporation, Taipei (TW)

( * ) Notice: Subject to any disclaimer, the term of this patent is extended or adjusted under 35 U.S.C. 154(b) by 152 days.

(21) Appl. No.: 11/669,077

(22) Filed: Jan. 30, 2007

(65) Prior Publication Data
US 2008/0180891 A1 Jul. 31, 2008

(51) Int. Cl.
G06F 1/16 (2006.01)
(52) U.S. Cl. .................. 361/684; 348/333.06; 381/306; 84/609
(58) Field of Classification Search ................ 455/41.2, 455/575.4; 370/50; 381/306, 333; 348/333.06, 348/231.99; 84/483, 609; 361/679–678, 361/724–727
See application file for complete search history.

(56) References Cited

U.S. PATENT DOCUMENTS

| | | | |
|---|---|---|---|
| 6,181,550 B1 * | 1/2001 | Kim ............................ | 361/683 |
| 6,587,151 B1 * | 7/2003 | Cipolla et al. ............... | 348/373 |
| 2002/0141164 A1 * | 10/2002 | Watanabe et al. ........... | 361/749 |
| 2006/0078143 A1 * | 4/2006 | Yang .......................... | 381/333 |
| 2007/0174645 A1 * | 7/2007 | Lin ............................. | 713/322 |

* cited by examiner

Primary Examiner—Hung V Duong
(74) Attorney, Agent, or Firm—Workman Nydegger

(57) ABSTRACT

A portable electronic device including a first body, a second body, and at least one speaker is provided. The second body is pivotally connected to one side edge of the first body, such that the second body is selectively rotated to cover the first body, or to form an angle with respect to the first body. The speaker is movably disposed on an upper surface of the first body, and can be moved relative to the first body. Thus, the speaker can be moved and fixed to a predetermined position to achieve optimized output sound quality.

13 Claims, 7 Drawing Sheets

PORTABLE ELECTRONIC DEVICE

BACKGROUND OF THE INVENTION

1. Field of Invention

The present invention relates to a portable electronic device, and more particularly to a portable electronic device for achieving optimized output sound quality by moving the speaker to change position.

2. Related Art

The application of multi-media such as films, music, and video games has become the mainstream application for portable electronic devices in the future. Since the volume of the portable electronic devices is relatively small, there is no sufficient space in speakers currently used in portable electronic devices for sound resonance, the portable electronic devices have a small sound output power and poor output sound quality. Moreover, as a speaker is usually fixed at a certain position, the relative position between the speaker and the main body of a portable electronic device cannot be changed. Thus, the relative position of the speaker cannot satisfy the optimization requirement in different operating modes. To solve the above problems, a portable external speaker combined with the portable electronic device is adopted. However, the portable external speaker is an extra kit for a user, thus causing inconvenience.

Furthermore, a portable electronic device available today has multiple functions. For example, a smart phone integrates the functions of a mobile phone and a personal digital assistant (PDA) into a single device which can perform the applications of multi-media such as films, music, and video games via application software. However, the input/output interface of the portable electronic device cannot meet the requirements of different application modes at the same time, such that how to improve the design of the input/output interface has become a subject of the portable electronic device to be solved.

SUMMARY OF THE INVENTION

In view of the above, the object of the present invention is to provide a portable electronic device for improving output sound quality of a speaker thereof and improving the input/output interface to meet the requirements of different operating modes.

To achieve the above object, a portable electronic device of the present invention is provided, which includes a first body, a second body, and at least one speaker. The second body is pivotally connected to a side edge of the first body, such that the second body is selectively rotated to cover the first body, or to form an angle with respect to the first body. The speaker is movably disposed on an upper surface of the first body to be moved relative to the first body. Thus, the speaker can be moved and fixed to a predetermined position on the first body to achieve optimized output sound quality.

Furthermore, a first display screen and a second display screen are respectively disposed on both side surfaces of the second body, so as to provide an image display whenever the second body covers the first body or forms an angle with respect to the first body, thereby forming different operating modes.

The present invention provides different operating and display configurations in different operating modes, such that a user can obtain optimized operating and display configurations in different operating modes. Besides, the speaker can be fixed at an optimal position to achieve optimized output sound quality.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
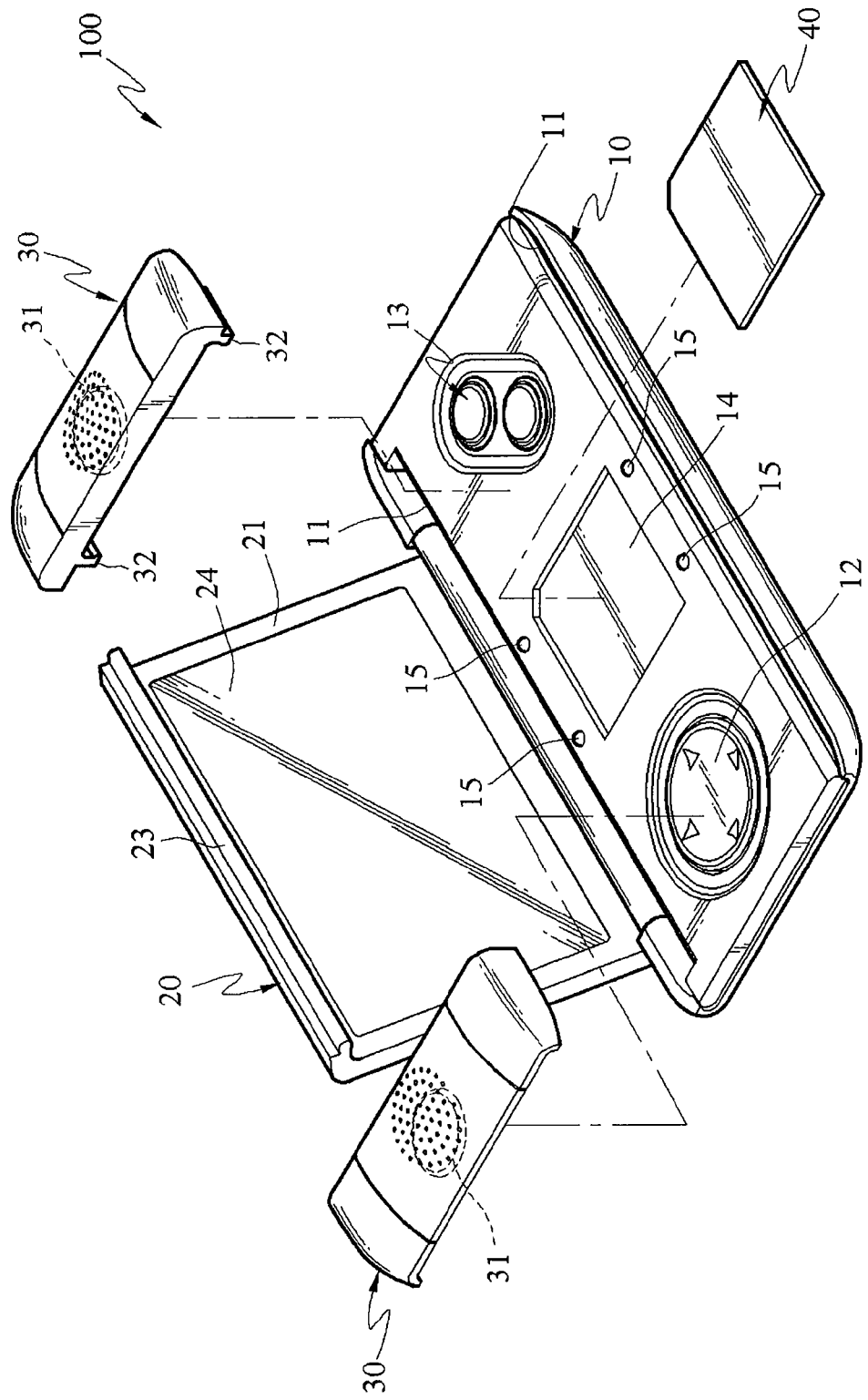
FIG. 1 is an exploded isometric view of a portable electronic device according to an embodiment of the present invention.
Figure 2:
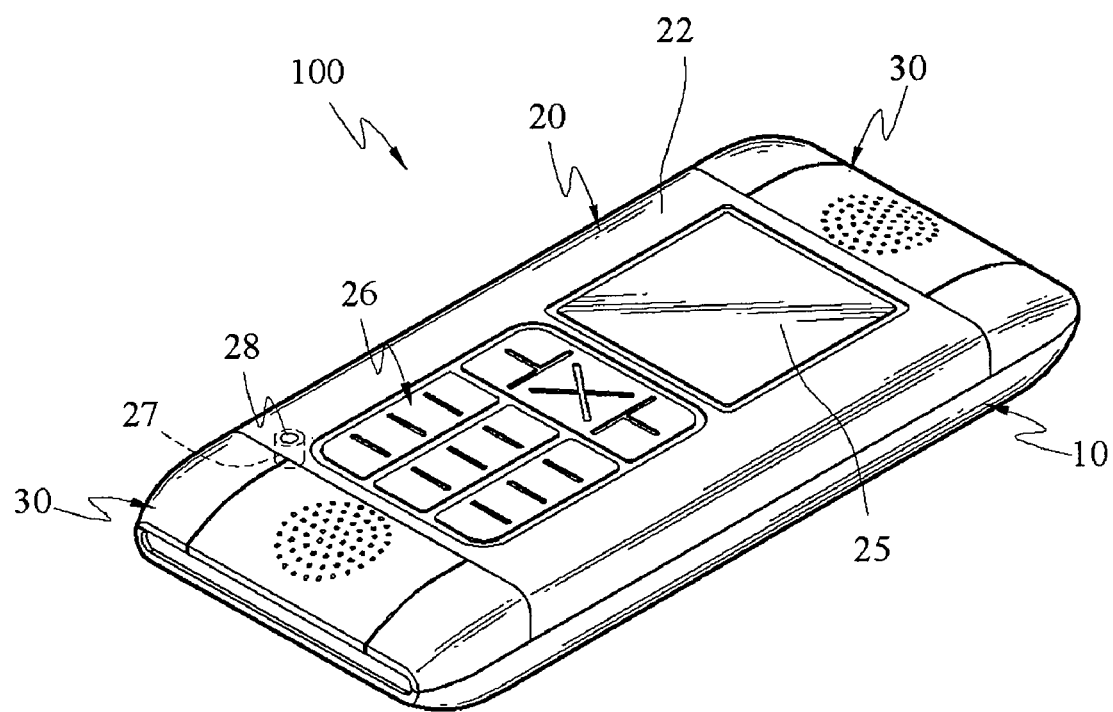
FIG. 2 is a perspective view of the portable electronic device according to an embodiment of the present invention with the second body covering the first body.
Figure 3:
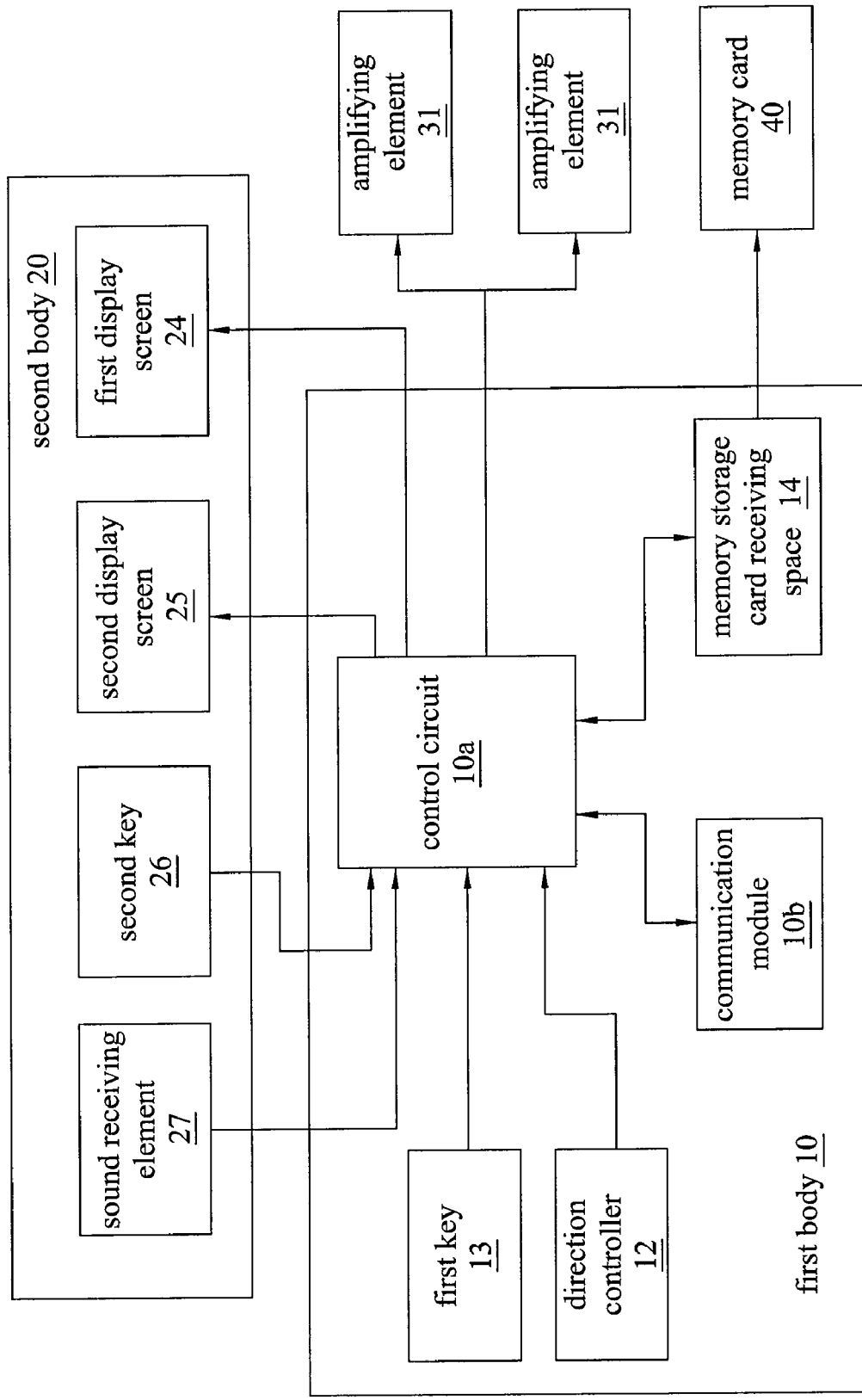
FIG. 3 is a block diagram of the circuit of the portable electronic device according to the embodiment of the present invention.

Referring to FIGS. 1, 2, and 3, a portable electronic device 100 of an embodiment of the present invention is provided, wherein the portable electronic device 100 includes a first body 10, a second body 20, and two speakers 30.

A control circuit 10*a* and a communication module 10*b* are disposed in the first body 10. The control circuit 10*a* is provided to receive and process signals. The communication module 10*b* is electrically connected to the control circuit 10*a*, wherein the communication module 10*b* is used to transmit and receive wireless signals through a wireless communication protocol, so as to transmit the signals to the control circuit 10*a*. Two guiding slots 11 are formed on a upper surface of the first body 10, and the two guiding slots 11 are formed along the two opposite long sides of the upper surface of the first body 10, wherein the width of the opening of each guiding slot 11 is smaller than that of the interior of the guiding slot 11.

Moreover, a direction controller 12 and a plurality of first keys 13 are disposed on the upper surface of the first body 10. The direction controller 12 is electrically connected to the control circuit 10*a* and is provided to be pushed forward, backward, leftward, rightward to generate directional signals respectively corresponding to the forward, backward, leftward, rightward directions, and the directional signals are then transmitted to the first body 10, such that the control circuit 10a performs corresponding actions after receiving the directional signals. The first keys 13 are electrically connected to the control circuit 10a, and each of the first keys 13 is provided to be pressed to generate a corresponding functional signal which is then transmitted to the first body 10, such that the control circuit 10a performs corresponding actions after receiving the functional signals. Meanwhile, a memory storage card receiving space 14 is formed on the middle section of the upper surface of the first body 10, and a memory storage card socket disposed in the memory storage card receiving space 14 is electrically connected to the control circuit 10a. The memory storage card receiving space 14 is provided for a memory storage card 40 being placed therein, and allowing the control circuit 10a of the first body 10 to access data stored in the memory storage card 40. The memory storage card receiving space 14 is located between the direction controller 12 and the plurality of first keys 13, and the direction controller 12 is corresponding to one short side of the first body 10 while the first keys 13 are corresponding to the other short side of the first body 10.

One side edge of the second body 20 is pivotally connected to a long side of the first body 10, and thus the second body 20 is selectively rotated to cover the first body 10, or to form an angle with respect to the first body 10. Moreover, the measure of area of a side surface of the second body 20 is smaller than that of the upper surface of the first body 10, such that the second body 20 overlays part of the upper surface of the first body 10 when covering the first body 10. Further, the second body 20 is pivotally connected to the middle section of a long side of the first body 10, when the second body 20 covers the first body 10, the second body 20 overlays the middle section of the upper surface of the first body 10, and exposes the portions corresponding to both ends of the long side on the upper surface of the first body 10.

Figure 4:
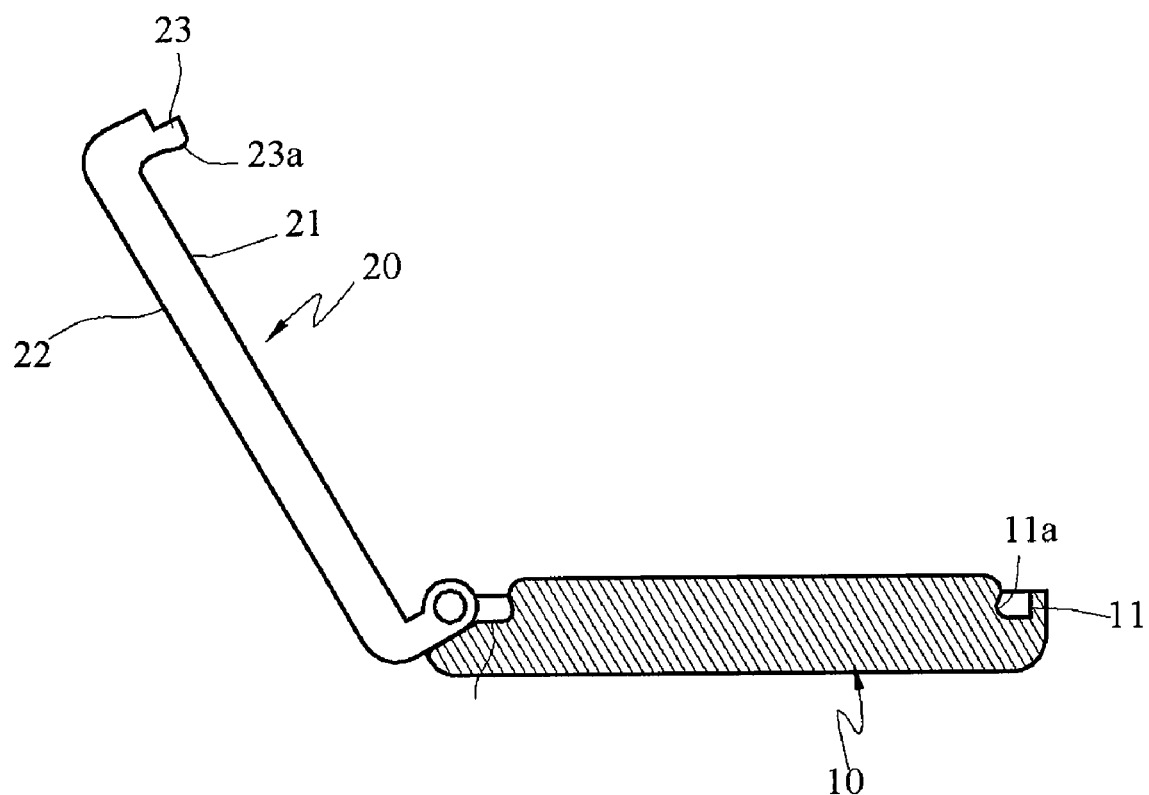
FIG. 4 is a sectional view of the portable electronic device according to the embodiment of the present invention with the second body forming an angle with respect to the first body.
Figure 5:
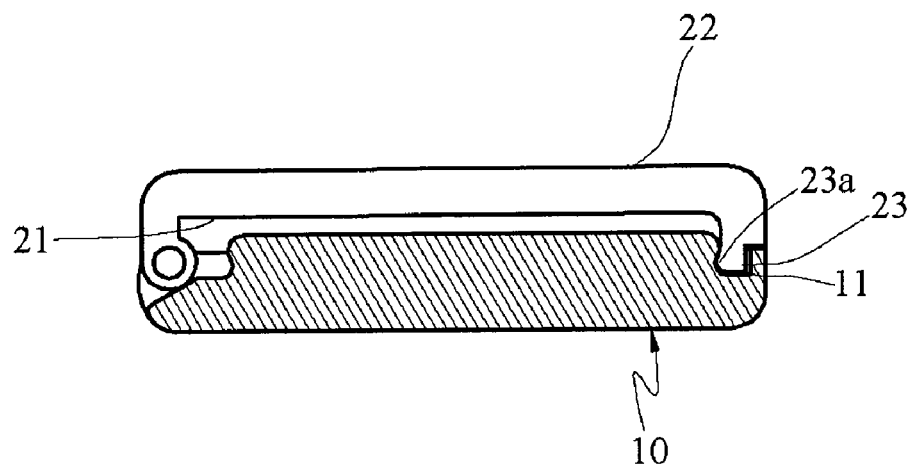
FIG. 5 is a sectional view of the portable electronic device according to the embodiment of the present invention with the second body covering the first body.

Then, referring to FIGS. 1, 4 and 5, the second body 20 has an inner side surface 21 and an outer side surface 22 opposite to the inner side surface 21. When the second body 20 covers the first body 10, the inner side surface 21 faces the first body 10. A latching element 23 is formed on another side edge of the second body 20, and the latching element 23 perpendicularly protrudes from the inner side surface 21 of the second body 20. Moreover, the latching element 13 extends along the long side of the second body 20 corresponding to one of the guiding slots 11 of the first body 10. The guiding slot 11 has a recess portion 11a formed on an inner wall of the guiding slot 11, such that the width of the opening of the guiding slot 11 is smaller than that of the interior of the guiding slot 11. The latching element 23 has a protruding retaining portion 23a to be inserted into the guiding slot 11, and the width of the opening of the guiding slot 11 allows the front end of the latching element 23 to pass through. When the second body 20 covers the first body 10, the latching element 23 is inserted into the guiding slot 11, and the retaining portion 23a is embedded into the recess portion 11a of the guiding slot 11, such that the front end of the latching element is fixed in the guiding slot 11 to fix the second body 20 on the first body 10.

Referring to FIGS. 1, 2, and 3 again, a first display screen 24 is disposed on the inner side surface 21 of the second body 20, and is electrically connected to the control circuit 10a of the first body 10 for receiving a display signal generated by the control circuit 10a of the first body 10 to display an image corresponding to the display signal. A second display screen 25, a plurality of second keys 26, and a sound receiving element 27 are disposed on the outer side surface 22 of the second body 20, which are electrically connected to the control circuit 10a of the first body 10 respectively. The second display screen 25 may also receives the display signal generated by the control circuit 10a of the first body 10 to display an image corresponding to the display signal. The second keys 26 are arranged adjacent to the second display screen 25, and are pressed to generate input signals to the control circuit 10a of the first body 10. The sound receiving element 27 is disposed in the second body 20 corresponding to a side edge of the second body 20, and is provided to receive an external sound through a sound receiving hole 28 disposed on one side of the second body 20 and convert the sound into a sound signal which is then transmitted to the control circuit 10a of the first body 10.

The length of the two speakers 30 is approximately equal to the width of the first body 10, and the sum of the widths of the two speakers 30 plus the length of the second body 20 is approximately equal to the length of the first body 10. After the two speakers 30 are arranged adjacent to the two opposite short sides of the second body 20, the profile and area of the orthogonal projection formed by the second body 20 and the two speakers 30 are approximately equal to the profile and area of the upper surface of the first body 10, such that the second body 20 and the two speakers 30 entirely overlay the upper surface of the first body 10.

Each of the speakers 30 has an amplifying element 31 which is disposed inside the speaker 30. Each amplifying element 31 is electrically connected to the control circuit 10a of the first body 10 for receiving a sound signal generated by the control circuit 10a, so as to make a sound corresponding to the sound signal and sent out the sound from a plurality of sound output holes formed in the upper surface of the speaker 30.

Figure 6:
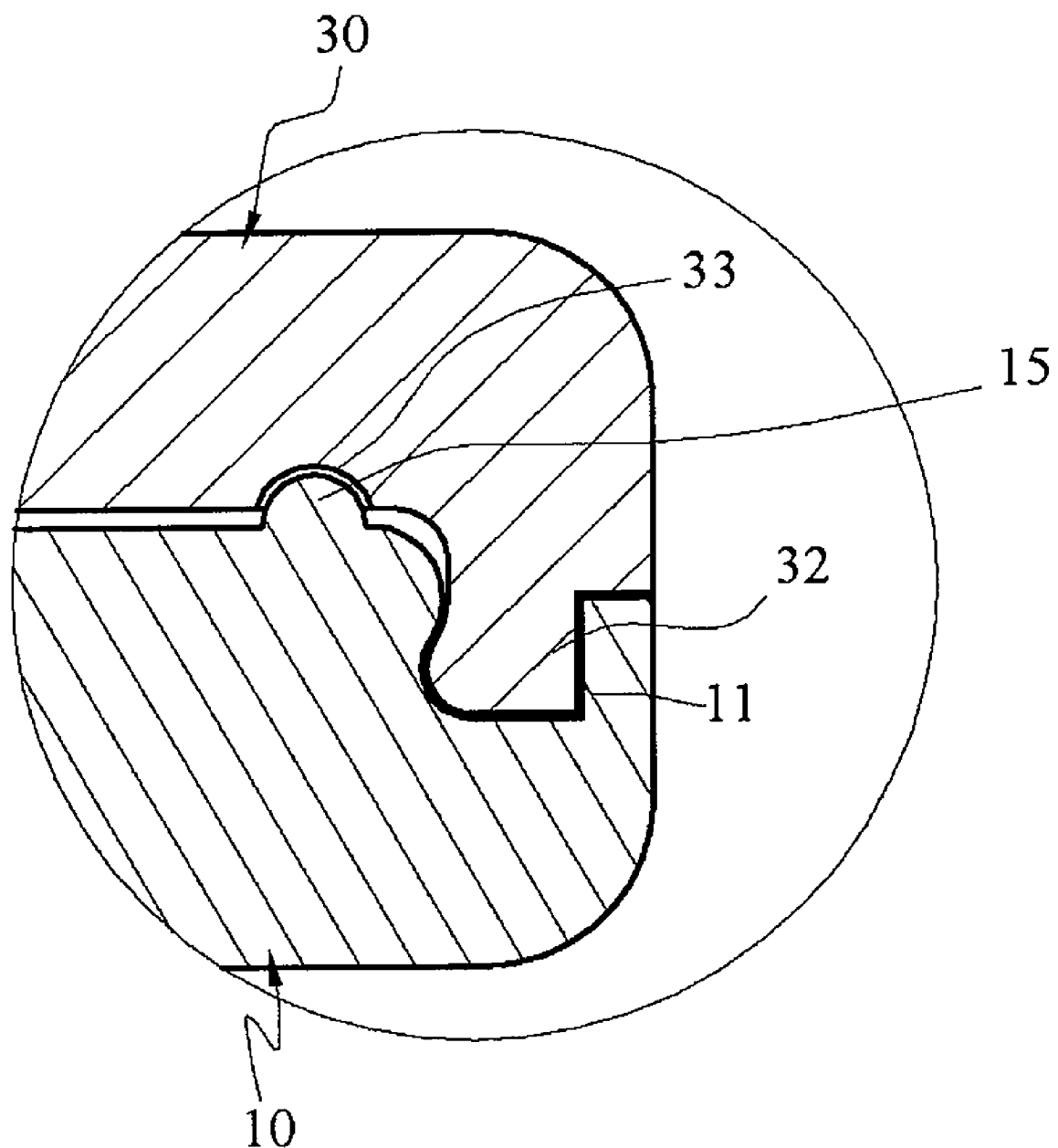
FIG. 6 is a partial sectional view of the portable electronic device according to the embodiment of the present invention.

Referring to FIGS. 1, 2, and 6, each of the speakers 30 has two guided rails 32 parallel to each other, and the guided rails 32 are formed on the bottom surface of the speakers 30. The thickness of the front edge of each guided rail 32 is larger than that of the base portion of the guided rail 32. Each guided rail 32 is provided to be embedded into the guiding slot 11 and slides along the longitudinal axis of the guiding slot 11. Thus, each speaker 30 is movably disposed on the upper surface of the first body 10, and each speaker 30 is moved relative to the first body 10.

Referring to FIGS. 2 and 5, the state that the second body 20 covers the first body 10 is illustrated. When the second body 20 covers the first body 10, the second body 20 overlays the middle section of the first body 10 with the inner side surface 21 facing the first body 10. Meanwhile, the latching element 23 of the second body 20 is also inserted into the corresponding guiding slot 11, such that the retaining portion 23a of the latching element 23 is embedded in the recess portion 11a of the guiding slot 11 for fixing the second body 20 on the first body 10. The first display screen 24 faces the first body 10, while the second display screen 25, the second keys 26, and the sound receiving hole 28 face the outside. At the same time, the two speakers 30 are respectively moved to the portions not being covered by the second body 20, i.e., moved toward the two short sides of the first body 10, such that the upper surface of the first body 10 is overlaid by the second body 20 and the two speakers 30.

Referring to FIG. 3, under this circumstance, the operation mode of the portable electronic device 100 is set to be a mobile phone mode. With the second keys 26, the user performs phone functions, for example, transmitting functional signals such as dial, call, answer, halt, or simple text message input signals externally to the communication network through the communication module 10b. Moreover, one of the speakers 30 functions as a telephone receiver. The sound signal received by the communication module 10*b* through the communication network is transmitted to the speaker 30, such that the speaker 30 converts the sound signal into a sound through the amplifying element 31 and then outputs the sound. Further, the sound of the user is received by the sound receiving element 27 and converted into a sound signal. Then, the sound signal is transmitted to the communication network through the communication module 10*b*. The second display screen 25 exhibits messages concerning the telephone communication, such as the dial, caller ID, and simple text messages.

Figure 7:
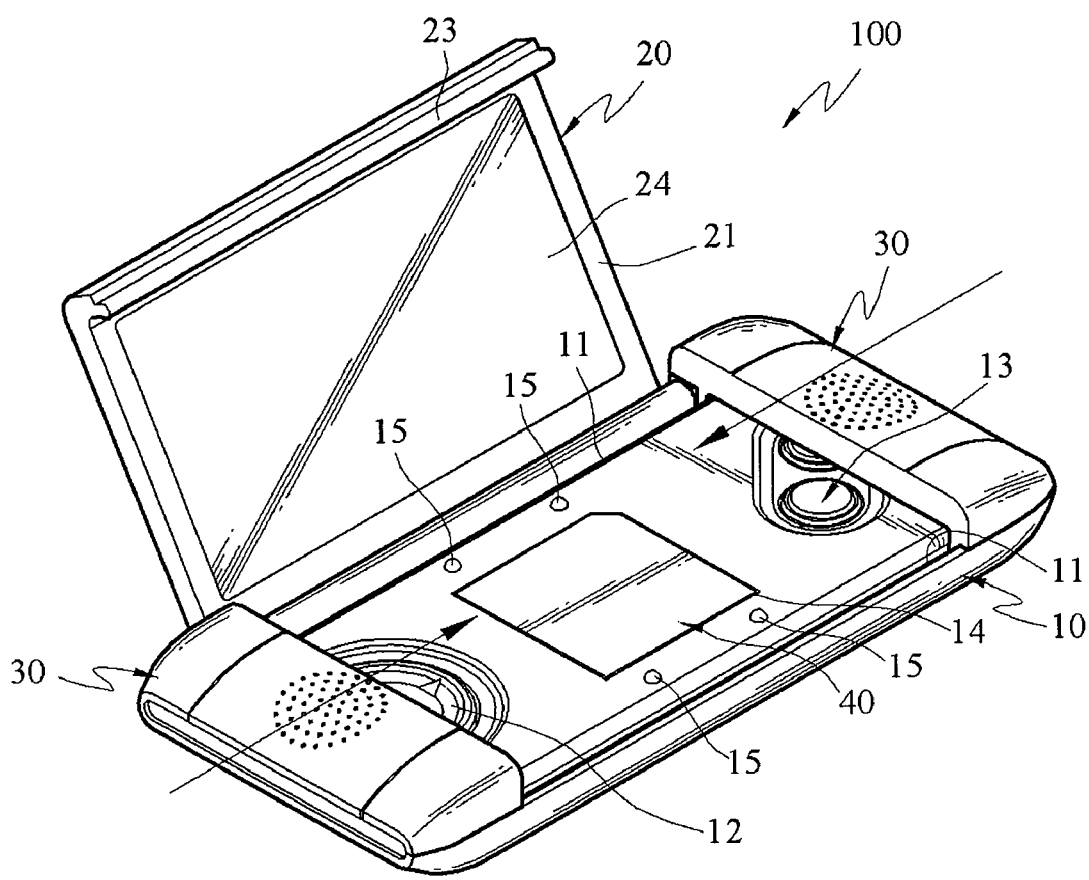
FIG. 7 is a perspective view of the portable electronic device according to the embodiment of the present invention with the second body unfolded and the two speakers apart.
Figure 8:
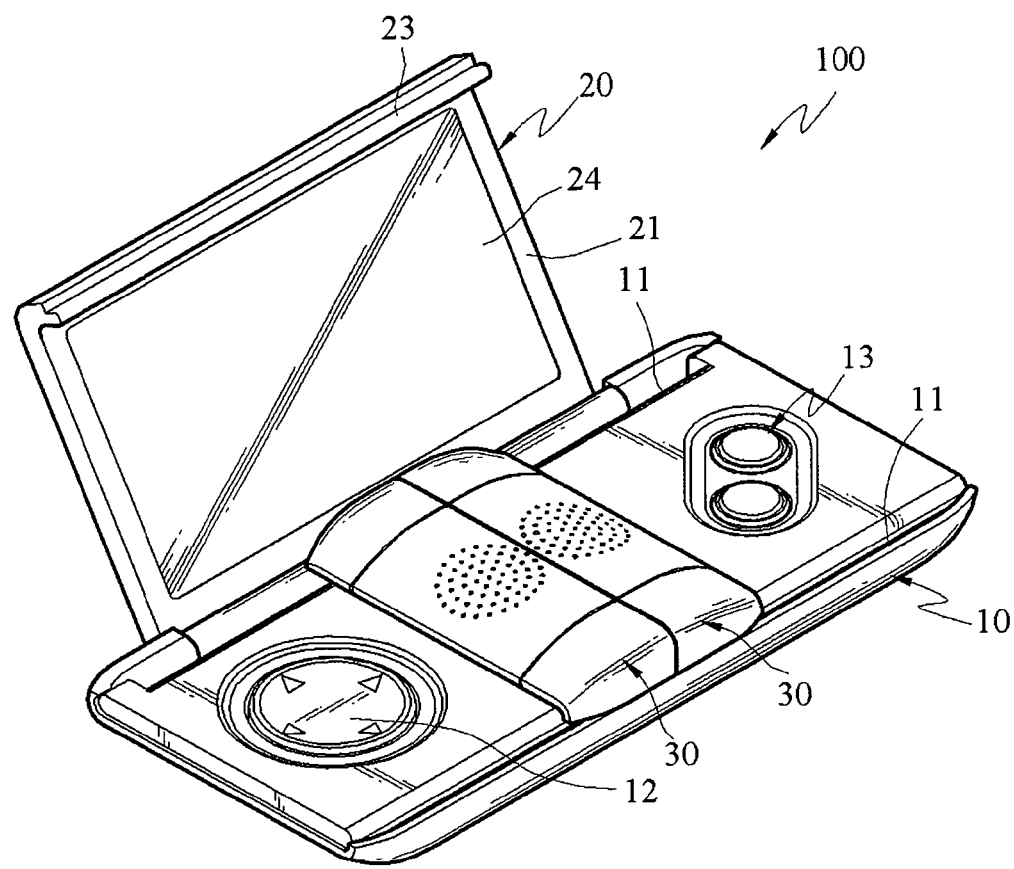
FIG. 8 is a perspective view of the portable electronic device according to the embodiment of the present invention with the second body unfolded and the two speakers getting close.
Figure 9:
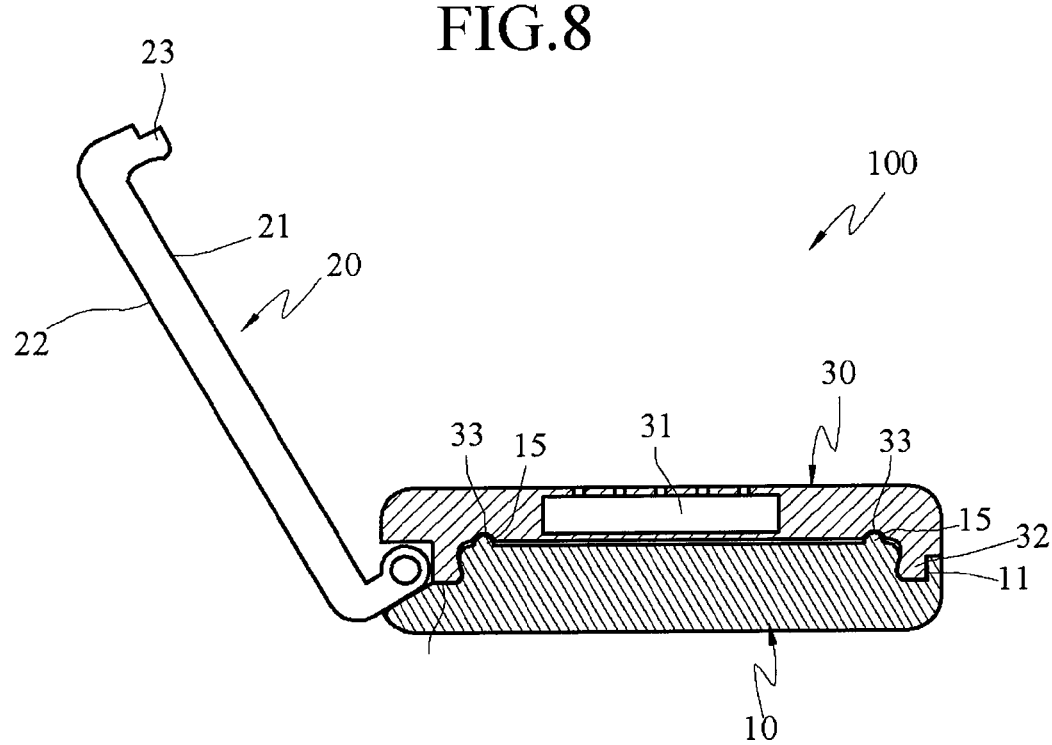
FIG. 9 is a sectional view of the portable electronic device according to the embodiment of the present invention.

Referring to FIGS. 7, 8, and 9, the second body 20 is unfolded, and forms an angle with respect to the first body 10. When the second body 20 is unfolded, the first display screen 24 faces the user for displaying image information. At this time, the memory storage card 40 is placed in the memory storage card receiving space 14, and meanwhile the two speakers 30 are moved toward the middle section of the first body 10 and press on the memory storage card 40. After the speakers 30 are moved to the middle section of the first body 10, the direction controller 12 and the first keys 13 are exposed for the user to press.

In order to fix the speakers 30 on the middle section of the first body 10 to avoid sliding relative to the first body 10, a plurality of positioning bumps 15 is formed on the upper surface of the first body 10 respectively corresponding to a plurality of positioning depressions 33 at the bottom of the speakers 30. When the speakers 30 slide to a predetermined position on the first body, each positioning bump 15 formed on the upper surface of the first body 10 is embedded into the corresponding positioning depression 33 to position the speakers 30.

Under this circumstance, the operation mode of the portable electronic device 100 is set to be a multi-media mode to make the control circuit 10*a* access the data stored in the memory storage card 40, such that the portable electronic device 100 is used to play audio files, run game software, or run application programs. The direction controller 12 is used to input a directional signal to the control circuit 10*a* of the first body 10 for moving the cursors or icons shown on the first display screen 24. The function of the first keys 13 can be preset, so as to input corresponding signals into the control circuit 10*a* for the portable electronic device operating in a multi-media mode. As the speakers 30 are closed up, resonance effect can be generated to improve the output of the speakers 30.

The present invention can provide various operating and display interface forms in different operating modes, such that the user can acquire an optimized operating and display interface in different operating modes. Moreover, the speakers can be positioned at an optimal position according to requirements, so as to achieve optimized output sound quality.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable electronic device, comprising:
   a first body;
   a second body, pivotally connected to a side edge of the first body, wherein the second body is selectively rotated to cover the first body or to form an angle with respect to the first body; and
   at least one speaker, movably disposed on an upper surface of the first body, wherein the speaker is moved relative to the first body and to receive and convert a sound signal into a sound to be output.

2. The portable electronic device as claimed in claim 1, wherein at least one guided rail is formed on the upper surface of the first body, and at least one guiding slot protrudes from a bottom surface of the speaker, that the guided rail is provided to be embedded into the guiding slot and slides along a longitudinal axis of the guiding slot.

3. The portable electronic device as claimed in claim 2, wherein the second body has a latching element protruding from a side surface of the second body facing the first body, to be inserted into and fixed in the guiding slot.

4. The portable electronic device as claimed in claim 3, wherein the guiding slot has a recess portion formed on an inner wall thereof, and the latching element has a protruding retaining portion to be embedded into the recess portion.

5. The portable electronic device as claimed in claim 2, wherein the width of an opening of the guiding slot is smaller than that of an interior of the guiding slot.

6. The portable electronic device as claimed in claim 1, wherein a direction controller is disposed on the upper surface of the first body, the direction controller is provided to be pushed forward, backward, leftward, rightward to respectively generate directional signals corresponding to the forward, backward, leftward, rightward directions, and the directional signals are then transmitted to the first body.

7. The portable electronic device as claimed in claim 1, wherein a plurality of first keys are disposed on the upper surface of the first body, and each of the first keys is provided to be pressed to generate a corresponding functional signal to be transmitted to the first body.

8. The portable electronic device as claimed in claim 1, wherein a memory storage card receiving space is formed on the upper surface of the first body, for a memory storage card being placed therein and allowing the first body to access data stored in the memory storage card.

9. The portable electronic device as claimed in claim 1, wherein a first display screen is disposed on a side surface of the second body, and a second display screen is disposed on another side surface of the second body; the first display screen and the second display screen are electrically connected to the first body for receiving display signals generated by the first body, so as to display image corresponding to the display signals.

10. The portable electronic device as claimed in claim 1, further comprising a plurality of second keys disposed on a side surface of the second body away from the first body, wherein the second keys are pressed to generate input signals to the first body.

11. The portable electronic device as claimed in claim 1, wherein a sound receiving element is disposed in the second body and electrically connected to the first body, and a communication module disposed in the first body, wherein the sound receiving element is provided to receive and convert a sound into a sound signal, and the sound signal is then transmitted with the communication module.

12. The portable electronic device as claimed in claim 1, further comprising a communication module for receiving the sound signal via a communication network and transmitting the sound signal to the speaker.

13. The portable electronic device as claimed in claim 1, wherein the second body and the speaker entirely overlay the upper surface of the first body.

* * * * *